(12) United States Patent
Halbach et al.

(10) Patent No.: US 10,022,893 B2
(45) Date of Patent: Jul. 17, 2018

(54) CLOCKED REGULATION OF THE AMOUNT OF PLASTER PASTE

(71) Applicant: Knauf Gips KG, Iphofen (DE)

(72) Inventors: Martin Halbach, Niederwerrn (DE); Jürgen Martin, Kleinlangheim (DE); Gosbert Grebner, Albertshofen (DE); Andreas Hanauer, Theilheim (DE)

(73) Assignee: Knauf Gips KG, Iphofen (DE)

( * ) Notice: Subject to any disclaimer, the term of this patent is extended or adjusted under 35 U.S.C. 154(b) by 352 days.

(21) Appl. No.: 14/651,310

(22) PCT Filed: Dec. 12, 2012

(86) PCT No.: PCT/EP2012/075266
§ 371 (c)(1),
(2) Date: Jun. 11, 2015

(87) PCT Pub. No.: WO2014/090300
PCT Pub. Date: Jun. 19, 2014

(65) Prior Publication Data
US 2015/0314481 A1   Nov. 5, 2015

(51) Int. Cl.
*B28B 19/00* (2006.01)
*B32B 38/00* (2006.01)
*B32B 37/20* (2006.01)

(52) U.S. Cl.
CPC .......... *B28B 19/0092* (2013.01); *B32B 37/20* (2013.01); *B32B 38/0012* (2013.01); *B32B 2250/02* (2013.01); *B32B 2607/00* (2013.01)

(58) Field of Classification Search
CPC .................................. B28B 19/0092

USPC ....................................... 156/45, 39
See application file for complete search history.

(56) References Cited

U.S. PATENT DOCUMENTS

| 2,168,803 | A | * | 8/1939 | Page | B28B 19/0092 |
| | | | | | 156/347 |
| 2,246,987 | A | * | 6/1941 | Roos | B28B 5/027 |
| | | | | | 156/347 |
| 2,991,824 | A | * | 7/1961 | Loechl | B28B 19/0092 |
| | | | | | 156/347 |
| 2,991,826 | A | * | 7/1961 | Armstrong | B28B 19/0092 |
| | | | | | 156/347 |

(Continued)

FOREIGN PATENT DOCUMENTS

| EP | 0482810 A1 | 4/1992 |
| EP | 1338393 A1 * | 8/2003 |

(Continued)

*Primary Examiner* — Jeffry H Aftergut
(74) *Attorney, Agent, or Firm* — The Webb Law Firm

(57) ABSTRACT

The invention relates to a method for producing a plaster board having the steps: —provision of a conveyor belt apparatus having a carrying belt, —application of a first sheath to the carrying belt, —application of a plaster slurry to the first sheath to form a plaster coat and —application of a second sheath to the applied plaster slurry to form a plaster layer comprising first sheath, plaster layer and second sheath, —levelling of the plaster layer with a levelling bar or a levelling roller, wherein the amount V(t) of the plaster slurry introduced between the first sheath and the second sheath is reduced at a predefined clock frequency f over a predefined time period $t_A$ compared to a target amount VV.

18 Claims, 4 Drawing Sheets

(56) References Cited

U.S. PATENT DOCUMENTS

| | | | | |
|---|---|---|---|---|
| 3,050,104 | A | * | 8/1962 | Burt .................... B28B 19/0092 |
| | | | | 156/347 |
| 5,198,052 | A | * | 3/1993 | Ali ......................... B28B 11/08 |
| | | | | 156/209 |
| 7,470,338 | B2 | | 12/2008 | Callais et al. |
| 8,252,110 | B2 | | 8/2012 | Rigaudon et al. |
| 8,277,586 | B2 | * | 10/2012 | Laurent ............... B28B 11/0863 |
| | | | | 156/220 |
| 8,372,240 | B2 | | 2/2013 | Jallon et al. |
| 2001/0044016 | A1 | * | 11/2001 | Watras .................... B28B 5/027 |
| | | | | 428/292.1 |
| 2005/0224154 | A1 | | 10/2005 | Capron |

FOREIGN PATENT DOCUMENTS

| | | | |
|---|---|---|---|
| EP | 1499482 | B1 | 4/2006 |
| RU | 2265514 | C2 | 10/2005 |
| RU | 2354551 | C2 | 5/2009 |
| RU | 2427550 | C2 | 8/2011 |
| SU | 1114642 | A | 9/1984 |
| WO | WO-03/084724 | A1 * | 10/2003 |
| WO | WO-03/092976 | A1 * | 11/2003 |
| WO | 2012155950 | A1 | 11/2012 |
| WO | WO-2012/155950 | A1 * | 11/2012 |

\* cited by examiner

CLOCKED REGULATION OF THE AMOUNT OF PLASTER PASTE

CROSS-REFERENCE TO RELATED APPLICATION

This application is the United States national phase of and claims priority to International Application No. PCT/EP2012/075266 filed Dec. 12, 2012, the disclosure of which is hereby incorporated in their entirety by reference.

BACKGROUND OF THE INVENTION

Field of the Invention

The invention relates to methods for producing a plaster board and to plaster-board production installations.

Description of Related Art

Methods for producing a plaster board and a plaster-board production installation having a conveyor belt device are known in the prior art. A main function of the conveyor belt device is to allow a moist plaster layer applied to it to set, so that the plaster layer can be further processed by dividing it into plaster boards. Such plaster boards can then for example be mounted onto the wall or the ceiling at a construction site.

It is also known to produce by means of such a method or by means of such a plaster-board production installation plaster boards that have a tapering at their four edges, in order to make easy troweling possible, or covering the joints when laying a number of plaster boards one against the other. In this respect, reference is made for example to EP 1 499 482 B1, US 2001/0044016, EP 0 482 810 or PCT/EP2011/057771.

The methods and devices for introducing indentations or for introducing impressions that are shown in these cited documents are included in the present application by reference.

It has however been found that, when introducing indentations or impressions into a plaster layer, a slight convexity with a height of a few 1/10 mm or less may occur in spite of providing an opposing element on the opposite side of the plaster layer. Although this does not impair the individual plaster board in its function or load-bearing capacity, when plaster boards formed in this way are stacked one on top of the other there may be a visible effect and also a bending of the upper boards in the stack of boards, since the outer convexities that are possibly present have a cumulative effect in the stack.

The object of the present invention is to provide a method for producing a plaster board and a plaster-board production installation with which the effects that may arise due to an intended displacement of material in the region of the hardening plaster layer are effectively counteracted.

SUMMARY OF THE INVENTION

This object is achieved in a method-related technical respect by a procedure according to the features of claim 1 and in a device-related technical respect by a plaster-board production installation according to the features of claim 9. Advantageous developments are specified in the subclaims.

A key consideration of the present invention is to make allowance for the displacements of material occurring when a desired effect is brought to bear on the hardening plaster layer already before the application of the plaster slurry. In a possible refinement, the invention is to this extent based on the consideration that those locations of the plaster layer at which indentations or impressions are later to be formed, and consequently a displacement of material occurs, are only covered with a reduced amount of plaster slurry already from the outset. To this extent it is provided in a method-related technical respect that the amount V(t) of plaster slurry introduced between the first liner and the second liner at a predefined clock frequency f over a predefined time period $t_A$ is reduced in comparison with a target amount.

In a preferred refinement, in which edge tapering is to be achieved by way of the indentations or impressions, allowance should be made for the fact that the linear extension of the indentations or impressions with respect to the length of the plaster board to be made is relatively small. To this extent it is provided in a specific refinement of the method that the time period $t_A$ of reducing the amount is less than 20%, in particular between 10% and 5%, of the period predefined by the clock frequency f. These values have been checked for all relevant belt speeds and are appropriate.

In a preferred refinement, indentations or impressions formed transversely in relation to the transporting direction are consequently introduced at a predefined spacing a into the plaster layer before hardening or after hardening has already begun, the clock frequency f being predefined or set such that the reduction in the amount of plaster slurry delivered is provided at the locations in the plaster layer at which the indentations or impressions are subsequently formed.

In a specific refinement, the spacing a at which the indentations or impressions are introduced corresponds to the length of the plaster boards later created by cutting transversely in relation to the transporting direction, plus a loss for cutting and subsequent treatment at the end edges d. In particular, the plaster layer is later cut in the region of the indentations or impressions for making plaster boards with a length l (a=l+d).

There are theoretically various conceivable alternatives for ensuring that the indentations or impressions are formed precisely at the locations at which a reduction in the amount of plaster slurry has previously been brought about. In a first alternative, the clock or the frequency with which new indentations or impressions are respectively formed on the plaster layer could be set to a fixed value. The frequency f with which the amount of plaster slurry is reduced and the phase of this process could then be set independently to exactly the same frequency value with the respectively suitable phase alignment. However, it must be expected that, when the introduction of the indentations or impressions is not synchronized with the reduction in the amount of plaster, the two processes get out of phase after the method or the plaster-board production installation has been in operation for a while. To this extent, a synchronization between the two processes, that is the introduction of indentations or impressions on the one hand and the preceding reduction in the amount of plaster slurry on the other hand, is regarded as a preferred refinement.

Such a synchronization can be realized by mechanical devices, such as for example a gear mechanism, or by control technology, in particular electronically.

The method according to the invention can be used in a first refinement, in the introduction of indentations by way of molding bars that circulate with the plaster layer on the conveyor belt device over a predefined setting time, that is to say when the method is combined with an indentation in the not yet hardened plaster layer.

In another refinement, the method may however also be used when impressions are to be introduced into the plaster layer that has already partially hardened. Impressions may be introduced for example by way of an impressing roller, a movable impressing stamp or similar devices. With regard to the various alternatives for introducing impressions, reference is made to EP 0 482 810.

The subject of the present patent application is also a plaster board that has been produced by the method according to the invention or a development of the method according to the invention and a plaster-board production installation. The plaster-board production installation according to the invention is distinguished by the fact that a metering device is provided, designed and set up to reduce in comparison with a target amount $V_V$ the amount $V(t)$ of plaster slurry introduced between the first liner and the second liner at a predefined clock frequency f over a predefined time period $t_A$.

In a preferred refinement, the metering device may interact with a control device, which predefines and possibly adjusts the clock frequency. Such a control device may be a control device assigned to the metering device itself or else a higher-level, in particular central, control device. In a preferred refinement, the control device assigned to the metering device or else the higher-level control device has the effect that a synchronization with a further process that is performed on the plaster-board production installation, such as for example a process of indenting or impressing by molding bars, is maintained.

In a first possible refinement, the metering device is arranged in the region of a molding table, in particular is integrated within the molding table, on which the plaster layer is formed and molded by bringing together the first liner, the plaster slurry and the second liner.

In a possible embodiment, the metering device comprises a restrictor blade, which is aligned transversely in relation to the transporting direction of the conveyor belt device and is designed to be movable in the direction of the plaster coat with a predefined stroke h in a direction orthogonal to the transporting direction and to the longitudinal alignment of the restrictor blade. In this case, the restrictor blade may act with a predefined stroke h on the plaster layer from above and bring about a reduction in the amount of the plaster coat in the plaster layer by lowering over a predefined time period.

It is however also possible that the restrictor blade acts with a predefined stroke h on the plaster layer from below and brings about a reduction in the amount of the plaster coat in the plaster layer by raising over a predefined time period. In both refinements discussed above, the stroke of the restrictor blade may be set to a maximum stroke, which is fixed to a value in the range from 0.5 mm to 5 mm, preferably 1 to 3 mm.

In another possible embodiment, the metering device comprises a restrictor roller, which is aligned transversely in relation to the transporting direction of the conveyor belt device and is designed to be movable in the direction of the plaster coat with a predefined stroke h in a direction orthogonal to the transporting direction and to the longitudinal direction of the transporting roller. In this case, the restrictor roller may act with a predefined stroke h on the plaster layer from above and bring about a reduction in the amount of the plaster coat in the plaster layer by lowering over a predefined time period. It is however also possible that the restrictor roller acts with a predefined stroke h on the plaster layer from below and brings about a reduction in the amount of the plaster coat in the plaster layer by raising over a predefined time period. In both refinements discussed above, the stroke of the restrictor roller may be set to a maximum stroke, which is fixed to a value in the range from 0.5 mm to 5 mm, preferably 1 to 3 mm.

While refinements in which the metering device is arranged in the region of the molding table or is integrated within the molding table have been discussed above, it is alternatively also conceivable to arrange the metering device in the region of the plaster feed, that is to say upstream in the feeding direction of the plaster slurry of a molding table on which the plaster layer is formed and molded by bringing together the first liner, the plaster slurry and the second liner.

The plaster-board production installation according to the invention may have an indenting device, which acts on the plaster coat downstream of the metering device in the transporting direction of the conveyor belt device on the plaster coat and creates indentations that are aligned transversely in relation to the transporting direction of the conveyor belt device in the region of the locations at which the metering device has brought about a reduction in the amount of plaster slurry.

In another possible refinement, the plaster-board production installation may also comprise an impressing device, which acts on the plaster layer downstream of the metering device in the transporting direction of the conveyor belt device and creates impressions in the region of the locations at which the metering device has brought about a reduction in the amount of plaster slurry.

In a refinement that is preferred overall, the frequency of the indentations or the impressions is synchronized with the control device of the metering device by way of a central control and/or by way of sensors.

BRIEF DESCRIPTION OF THE DRAWINGS

The invention is explained in more detail below, including with regard to further features and advantages, on the basis of the description of exemplary embodiments and with reference to the accompanying drawings, in which.

DETAILED DESCRIPTION OF THE PREFERRED EMBODIMENTS

Figure 1:
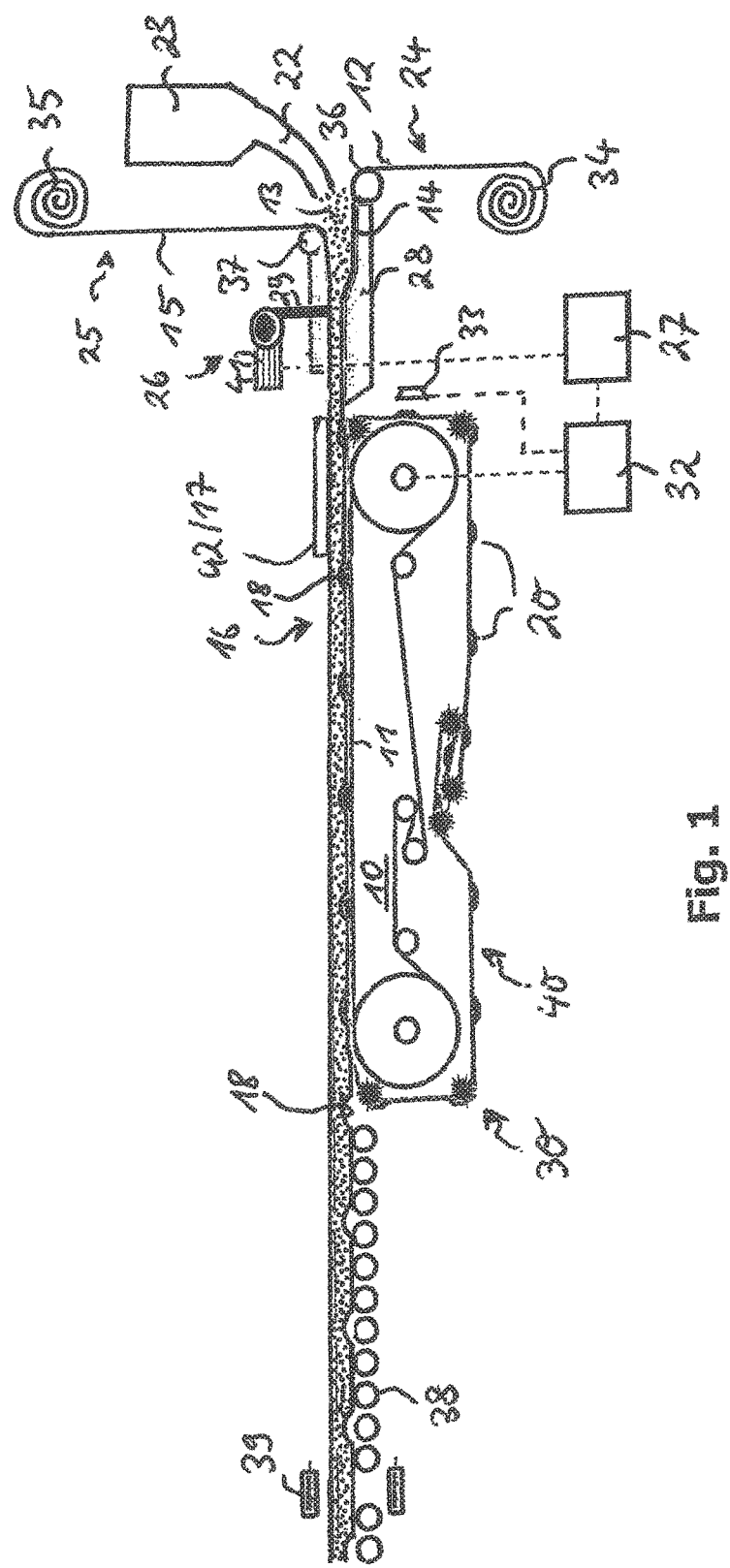
FIG. 1 shows a first embodiment of a plaster-board production installation according to the present invention in a schematic view.

In FIG. 1, a first embodiment of a plaster-board production installation according to the present invention is represented in a schematic view. The plaster-board production installation firstly comprises a molding table 28. On this molding table 28, a first liner 12 is fed from a first roller 34 by way of a first feed 24, which may comprise one or more first deflecting rollers 36. A plaster slurry 13 is fed onto this first liner 12. The plaster slurry 13 is mixed up in a mixer 23 and applied to the first liner 12 by way of a plaster feed 22. A second liner 15 is fed from a second roller 35 by way of a second feed 25, comprising a second deflecting roller 37, to the molding table 28 and there it is placed onto the plaster slurry 13. The first liner 12, the plaster slurry 13, which forms into a plaster coat 14 in the molding table 28, and also the second liner 15 are taken further by way of a conveyor belt device 10 as a plaster layer 16 hardening as time goes by and as the distance covered increases. The conveyor belt device 10 firstly comprises a supporting belt 11 and, adjoining the supporting belt 11, a roller conveyor 38. A cutting device 39 is also arranged in the region of the roller conveyor 38, in order to make the already substantially hardened plaster layer 16 into plaster boards of a predetermined length.

In the case of the present embodiment, an indenting device 30 is also operative between the supporting belt 11 and the first liner 12 of the plaster layer 16. In the case of the present embodiment, the indenting device 30 has a circulating molding bar belt 40, which is covered transversely in relation to its direction of movement with molding bars 20 at a predefined constant spacing. By way of the molding bars 20, the molding bar belt 40 runs on, and at the same speed as, the supporting belt 11. The molding bars 20 running transversely in relation to the transporting direction of the conveyor belt device 10 have the effect of forming indentations 18 at an equidistant spacing in the still not hardened plaster layer 16. On the side of the plaster layer 16 that is opposite from the molding bars 20, one or more opposing elements 42 are provided, preventing an upward displacement of material. The opposing element(s) 42 serve(s) in the present embodiment at the same time as the leveling bar for the plaster layer 16 formed in the molding table 28.

The fact that the circulating molding bar belt 40 runs along with the supporting belt 11 over a certain time period means that the plaster layer 16 can already set partially, so that the indentations 18 are dimensionally stable when the plaster layer 16 is transferred to the roller conveyor 38. The cutting device 39 cuts the plaster layer 16 at those locations at which the indentations 18 have been formed. With regard to this or alternative possible refinements of the circulating molding bar belt 40, reference is made to PCT/EP2011/057771.

Integrated within the molding table 28 is a metering device 26, which here comprises a restrictor blade 29.

The restrictor blade 29 enters the molding table 28 from above and is movable over a predefined stroke of approximately 0.5 to 5 mm, preferably 1 to 3 mm, in the vertical direction or in a direction substantially corresponding to the normal to the surface of the plaster layer 16 forming. For this purpose, the metering device 26 has a drive 41 and also a control device 27, in order to move the restrictor blade 29 with the predefined stroke, to be precise from a position of rest, in which a lower edge of the restrictor blade 29 lies against the second liner 15 from above or is located above the second liner 15. In a working position, the restrictor blade 29 is thus moved in the direction of the plaster layer 16, so that the lower edge of the restrictor blade 29 enters the plaster layer 16 while deforming the second liner 15. In this way, a predetermined amount of plaster slurry 13 is displaced, whereby the plaster layer 16 is filled with less plaster slurry 13 at the times in which the restrictor blade 29 is in the working position than at the times in which the restrictor blade 29 is in the position of rest.

Although the plaster-board production installation comprises opposing elements 42 in the region in which the molding bars 20 enter the plaster layer 16, the entry of the molding bars 20 into the plaster layer 16 still involves an associated displacement of material within the plaster slurry. In order to anticipate the reduced volume in the hardening plaster layer 16 as a result of the indenting by the molding bars 20, the stroke and the working time of the restrictor blade 29 are set such that the reduced filling of the plaster layer 16 with plaster slurry at the locations at which the molding bars 20 later enter takes place approximately in the volume that corresponds to the volume displaced by the molding bars 20.

While it would be possible to this extent to set the phase and clock of the metering device 26 by means of the control device 27 independently of the frequency with which the molding bars 20 enter the plaster layer 16 in the region of the opposing elements 42, it is nevertheless preferred if the movement of the circulating molding bar belt 40 is synchronized with the metering device 26, that is to say specifically with the drive 41 of the metering device 26.

Such a synchronization may take place by mechanical means; in the present embodiment, a synchronization is provided by means of control technology. A central control 32 controls or regulates the speed of the circulating molding bar belt 40, which corresponds overall to the speed of the plaster layer 16 within the conveyor belt device 10. The phase and circulating speed of the molding bars may be predefined by the central control 32 and/or in addition be additionally sensed by suitable sensors 33 in the region of the circulating molding bar belt 40. This actual information concerning the speed or frequency of the molding bars and their phase position is passed on via the central control 32 to the control device 27 of the metering device 26, so that the phase and frequency of the metering device 26 can be made to match exactly the phase and frequency of the molding bars 20 forming indentations in the plaster layer 16.

Figure 2:
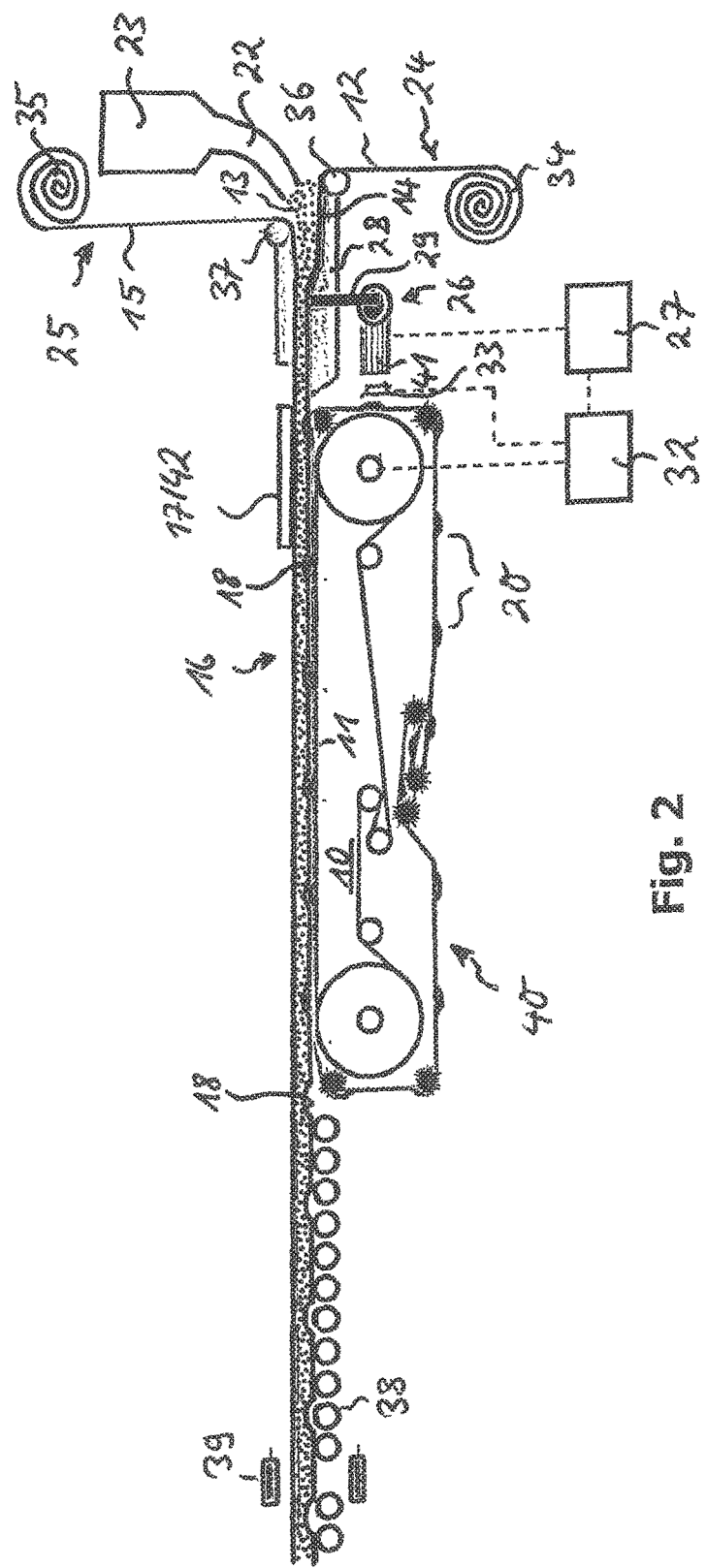
FIG. 2 shows a second embodiment of a plaster-board production installation according to the present invention in a schematic view.

In FIG. 2, an alternative embodiment is represented. To avoid repetition, reference is only made to the differing arrangement of the metering device 26. While in the case of the embodiment that is shown in FIG. 1 the restrictor blade 29 of the metering device enters the molding table 28 from above, in the case of the embodiment that is shown in FIG. 2 entry of the restrictor blade 29 into the molding table 28 from below is provided. To this extent, also in the case of the embodiment that is shown in FIG. 2 the metering device is provided with a drive 41 and a control device 27 that works in dependence on a central control 32. The metering device 26 is synchronized with the circulating molding bar belt 40 in the same way as described on the basis of the embodiment that is shown in FIG. 1.

In the case of the embodiment that is shown in FIG. 2, the restrictor blade 29 is in the position of rest when it lies against the first liner 12 from below or is arranged with an upper edge under the first liner 12. In a working position, the restrictor blade is moved by way of the drive 41 in the direction of the plaster layer 16 (upward) and presses into the plaster layer 16 to a depth of about 0.5-5 mm, preferably 1-3 mm, while deforming the first liner 12. By bringing the first liner 12 and the second liner 15 closer together in this way, the plaster layer 16 is filled with less plaster slurry 13. This reduced filling is only maintained over a comparatively short time period, a time period of an order of magnitude that corresponds to the width of a molding bar divided by the transporting speed of the conveyor belt device 10.

Figure 3:
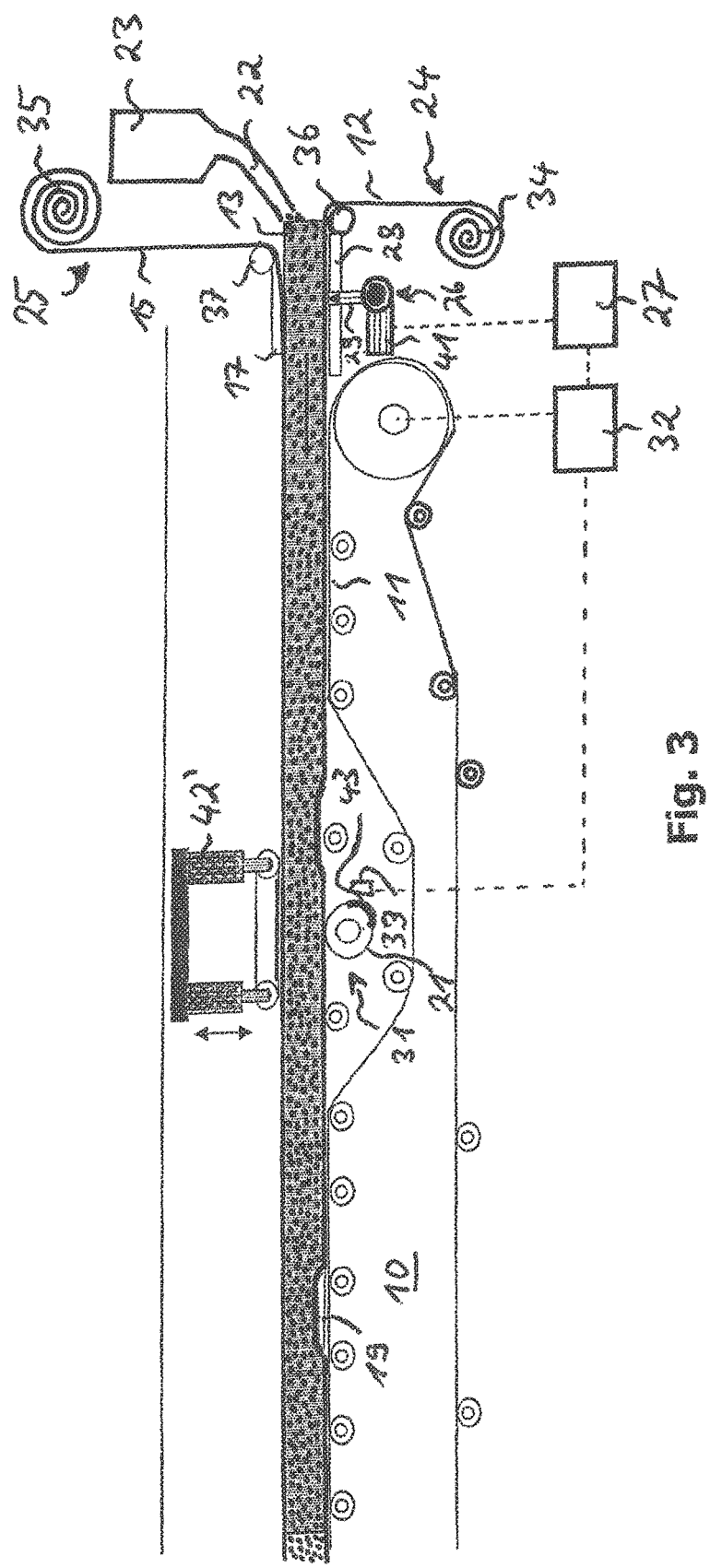
FIG. 3 shows a third embodiment of a plaster-board production installation according to the present invention in a schematic view.

In FIG. 3, an alternative embodiment is represented, differing from the embodiment that is shown in FIG. 2 substantially in that indentations 18 are not formed in the hardening plaster layer 16 by way of molding bars 20, but instead, after waiting a predetermined setting time, impressions 19 are formed in the already at least partially hardened plaster layer 16 by an impressing device 31. The impressing device 31 may for example comprise an impressing roller 21, which has an embossment 43 with a predetermined contour. The contour of the embossment 43 may for example be chosen such that an approximately trapezoidal impression 19 is obtained in the plaster layer 16.

In order to absorb the forces on the plaster layer 16 that occur during the impressing of the embossment 43, an opposing element 42' may be provided on the side of the plaster layer 16 that is opposite from the impressing roller 21. The opposing device 42' is preferably aligned adjustably in a direction parallel to the normal to the surface of the plaster layer 16 or in the vertical direction.

Also in the case of the embodiment that is shown in FIG. 3, a metering device 26, which likewise comprises a restrictor blade 29, is provided within the molding table 28. The structure and mode of operation of the metering device 26 with the restrictor blade 29 and the control device 27 are made to correspond to the embodiment that is shown in FIG. 2. Here, too, the synchronization takes place in the same way, i.e. the metering device 26 is operated in synchronization with the impressing device 31. For this purpose, a central control 32 controls or regulates the impressing device 31 and at the same time the speed of the supporting belt 11. In addition, the introduction of impressions by the impressing device 31 may be monitored by means of sensors 33. On the basis of this actual information concerning the functional position of the impressing device 31 or the speed of the supporting belt 11, a reduced filling of the plaster layer 16 made to match the frequency of the impressions 19 is set by way of the central control 32 and the control device 27 of the metering device 26. In this way it is therefore ensured that the plaster layer 16 is already filled with a reduced amount of plaster slurry 13 wherever impressions 19 are formed. To this extent it is regarded as advantageous if both the restrictor blade 29 of the metering device 26 and the impressing device 31 act on the plaster layer 16 from the first liner 12.

Figure 4A:
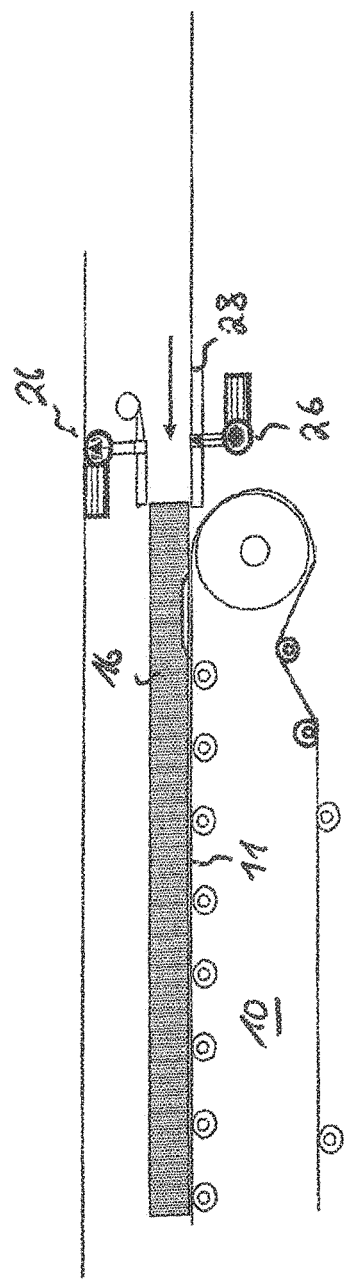
FIG. 4a shows a first variant for a metering device (in a schematic view).
Figure 4B:
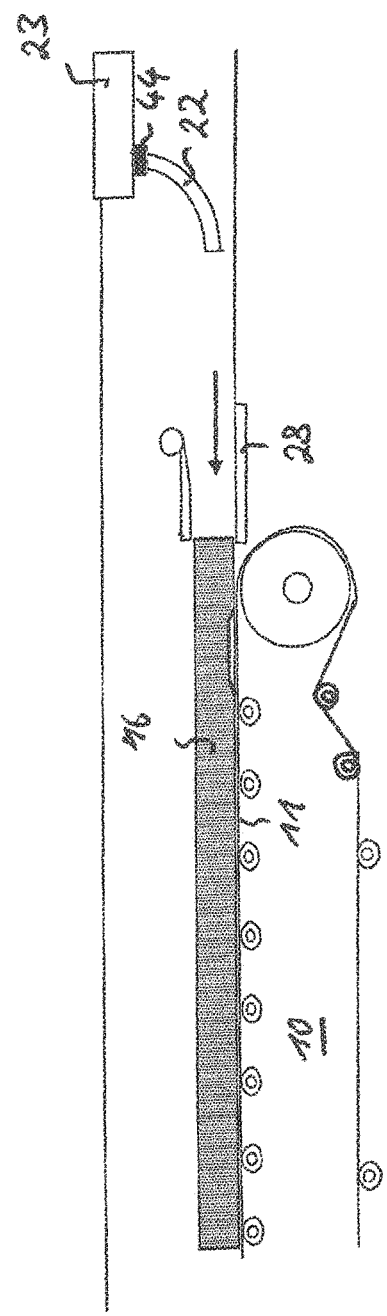
FIG. 4b shows a second variant for a metering device (in a schematic view).

In FIGS. 4a and 4b, two variants for a metering device 26 are also compared in a schematic view. In the case of the metering device 26 that is shown in FIG. 4a, a restrictor blade 29 that is operative from above and/or from below is arranged such that it is integrated in the molding table 28. In the case of the embodiment that is shown in FIG. 4b, a clocking of the amount of plaster slurry 13 introduced or a clocked reduced filling of the plaster layer 16 with plaster slurry 13 already takes place in the region of the plaster feed 22. For this purpose, a valve 44 that allows a clocked reduction in the plaster slurry that is fed may be arranged at an outlet of a mixer 23 or in the region of the plaster feed 22.

Although the clocked metering of the fed plaster slurry has always been described above in connection with the introduction of indentations or impressions running transversely in relation to the transporting direction, it is conceivable also to implement the clocked feeding or clocked variation of the fed amount of plaster slurry in other applications. The manner of introducing indentations or impressions is also not restricted in any way to the methods specifically described above. Rather, as already mentioned at the beginning, numerous variants that make the introduction of indentations or the introduction of impressions possible are known from the prior art.

LIST OF DESIGNATIONS 10 conveyor belt device
11 supporting belt
12 first liner
13 plaster slurry
14 plaster coat
15 second liner
16 plaster layer
17 leveling bar
18 indentations
19 impressions
20 molding bars
21 impressing roller
22 plaster feed
23 mixer
24 first feed
25 second feed
26 metering device
27 control device
28 molding table
29 restrictor blade
30 indenting device
31 impressing device
32 central control
33 sensors
34 first roller
35 second roller
36 first deflecting roller
37 second deflecting roller
38 roller conveyor
39 cutting device
40 circulating molding bar belt
41 drive
42, 42' opposing element
43 embossment
44 valve

The invention claimed is:

1. A method for producing a plaster board comprising the steps of:
   providing a conveyor belt device (10) having a supporting belt (11),
   applying a first liner (12) to the supporting belt (11),
   applying a plaster slurry (13) to the first liner (12) while forming a plaster coat (14),
   applying a second liner (15) to the applied plaster slurry (13) to form a plaster layer (16) comprising the first liner (12), the plaster coat (14) and the second liner (15), and
   leveling the plaster layer (16) with a leveling bar (17) or a leveling roller,
   characterized in that
      an amount V(t) of plaster slurry (13) introduced between the first liner (12) and the second liner (15) at a predefined clock frequency f over a predefined time period $t_A$ is reduced in comparison with a target amount $V_V$, whereby a reduction in the introduced plaster slurry is achieved,
      wherein the reduction of the introduced plaster slurry is achieved through a restrictor blade (29) or a restrictor roller of the plaster slurry introduced between the first liner (12) and the second liner (15) by moving the restrictor blade or the restrictor roller in the direction of the plaster coat (14) with a predefined stroke h, in a direction orthogonal to the transporting direction and to the longitudinal alignment of the restrictor blade (29) or the restrictor roller.

2. The method as claimed in claim 1, characterized in that the time period $t_A$ of reducing the amount is less than 20% of the period predefined by the clock frequency f.

3. The method for producing a plaster board as claimed in claim 1, characterized in that indentations (18) or impressions (19) formed transversely in relation to a transporting direction are introduced at a predefined spacing a into the plaster layer (16) before hardening or after hardening has already begun, the clock frequency f being predefined or set such that the reduction in the amount of plaster slurry delivered is provided at locations in the plaster layer (16) at which the indentations (18) or impressions (19) are subsequently formed.

4. The method as claimed in claim 3, characterized in that the predefined spacing a at which the indentations (18) or impressions (19) are introduced corresponds to a length l of the plaster boards later created by cutting transversely in relation to the transporting direction, plus a loss for cutting and subsequent treatment at end edges d.

5. The method as claimed in claim 4, wherein the plaster layer (16) is later cut in a region of the indentations (18) or impressions (19) for making plaster boards with the length l.

6. The method as claimed in claim 3, characterized in that the indentations (18) are achieved by way of molding bars (20) that run along with the plaster layer (16) on the conveyor belt device (10) over a predefined setting time.

7. The method as claimed in claim 3, characterized in that the impressions (19) are achieved by way of an impressing device (31).

8. The method as claimed in claim 1, characterized in that a synchronization between the indentations (18) or impressions (19) transversely in relation to the transporting direction and the preceding reductions in amount is ensured.

9. The method as claimed in claim 8, wherein the synchronization between the indentations (18) or impressions (19) transversely in relation to the transporting direction and the preceding reductions in amount is ensured by the spacing of the indentations (18) or impressions (19) in the plaster layer (16) being predefined and the frequency f of the reduction in amount in the plaster slurry (13) that may get out of phase being adjusted.

10. A plaster-board production installation, comprising:
a conveyor belt device (10) having a supporting belt (11),
a first feed (24) for a first liner (12) such that the first liner (12) is guided onto the supporting belt (11),
a plaster feed (22), which feeds a plaster slurry (13) from a mixer (23) to the first liner (12), in order in this way to form a plaster coat (14) on the first liner (12),
a second feed (25) for a second liner (15) such that the second liner (15) is applied to the plaster coat (14) and a plaster layer (16) comprising the first liner (12), the plaster coat (14) and the second liner (15) is formed, and also
a leveling device, such as for example a leveling bar (17) or a leveling roller, in order to level the plaster layer (16),
characterized by a metering device (26), which is configured to reduce in comparison with a target amount $V_V$ an amount $V(t)$ of plaster slurry (13) introduced between the first liner (12) and the second liner (15) at a predefined clock frequency f over a predefined time period $t_A$,
wherein the metering device is arranged in a region of a molding table (28) on which the plaster layer (16) is formed and molded by bringing together the first liner (12), the plaster slurry (13) and the second liner (15), and
wherein the metering device (26) comprises a restrictor blade (29) or restrictor roller, which is aligned transversely in relation to a transporting direction of the conveyor belt device (10) and is configured to be movable in a direction of the plaster coat (14) with a predefined stroke h in a direction orthogonal to the transporting direction and to a longitudinal alignment of the restrictor blade (29) or the restrictor roller.

11. The plaster-board production installation as claimed in claim 10, characterized in that the metering device (26) interacts with a control device (27), which predefines and possibly adjusts the clock frequency f.

12. The plaster-board production installation as claimed in claim 10, characterized in that the restrictor blade (29) or the restrictor roller acts with a respectively predefined stroke h on the plaster layer from above and brings about a reduction in the amount of the plaster coat (14) in the plaster layer (16) by lowering over a predefined time period.

13. The plaster-board production installation as claimed in claim 10, characterized in that the restrictor blade (29) or the restrictor roller acts with a respectively predefined stroke h on the plaster layer from below and brings about a reduction in the amount of the plaster coat (14) in the plaster layer (16) by raising over a predefined time period.

14. The plaster-board production installation as claimed in claim 10, characterized in that the stroke h of the restrictor blade or the restrictor roller is set to a maximum stroke, which is fixed to a value in a range from 0.5 mm to 5 mm.

15. The plaster-board production installation as claimed in claim 10, characterized in that an indenting device (30) is provided, acts on the plaster layer (16) downstream of the metering device (26) in the transporting direction of the conveyor belt device (10) and creates indentations (18) that are aligned transversely in relation to a transporting direction of the conveyor belt device in a region of the locations at which the metering device has brought about a reduction in the amount of plaster slurry (13).

16. The plaster-board production installation as claimed in claim 15, characterized in that the frequency of the indentations (18) or the impressions (19) is synchronized with the control device (27) of the metering device (26) by way of a central control (32) and/or by way of sensors (33).

17. The plaster-board production installation as claimed in claim 10, characterized in that an impressing device (31) is provided, acts also on the plaster layer (16) at a distance from the metering device (26) in a transporting direction of the conveyor belt device (10) on the plaster layer (16) and creates impressions (19) in a region of the locations at which the metering device has brought about a reduction in the amount of plaster slurry (13).

18. The plaster-board production installation as claimed in claim 17, characterized in that the impressing device (31) comprises an impressing roller or a movable impressing stamp.

* * * * *